2,930,511

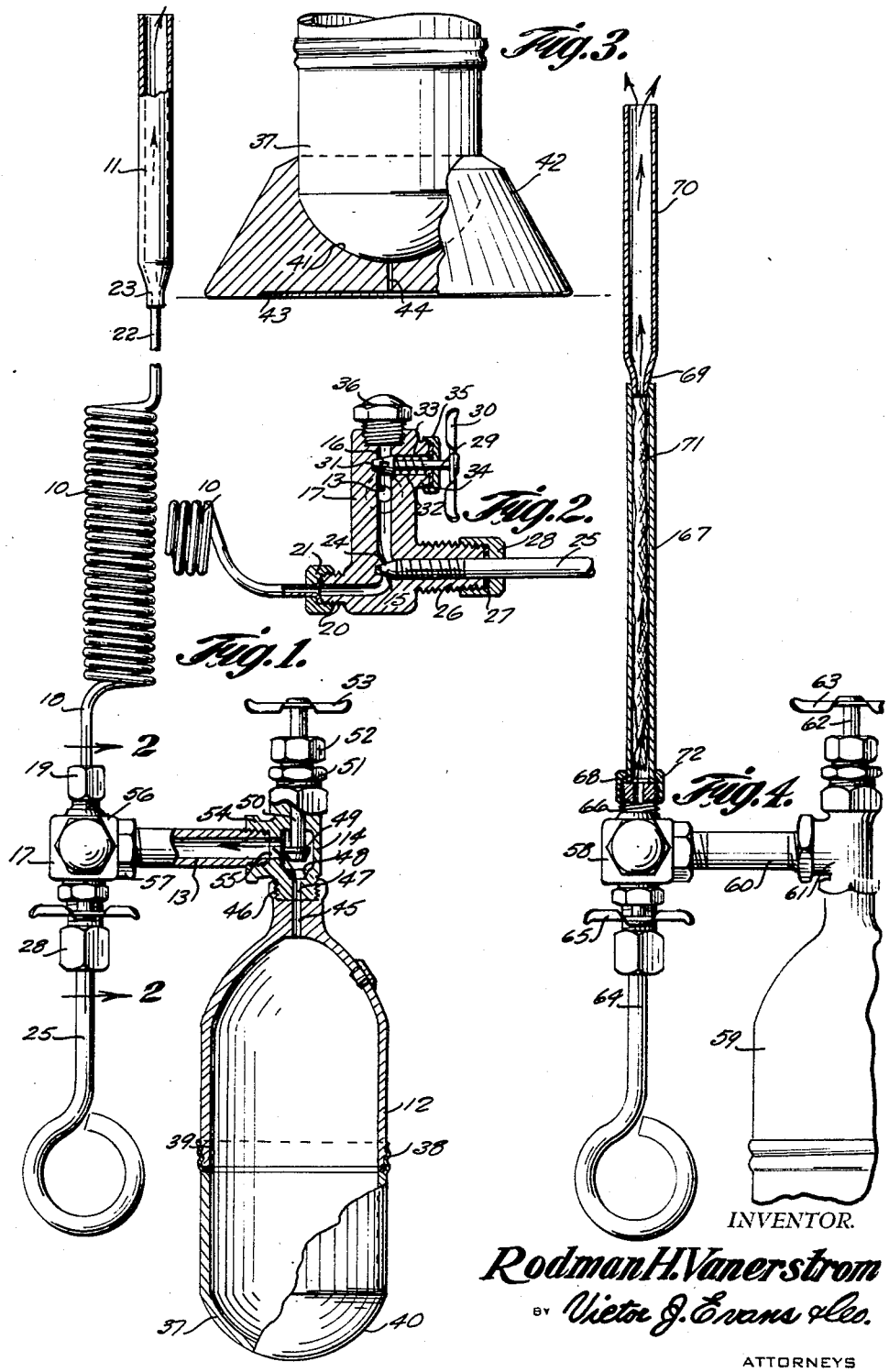

LEAK DETECTING APPARATUS

Rodman H. Vanerstrom, Chehalis, Wash.

Application April 10, 1956, Serial No. 577,405

2 Claims. (Cl. 222—3)

This invention relates to refrigeration, and in particular a leak detector which provides practical means for directing ammonia or sulphur fumes at a point where a leak may be possible whereby a leak may be located in a direct manner.

The purpose of this invention is to provide a device for detecting a leak of refrigerant gas in which the composition of the device is such that it creates its own chemical visible reaction obviating the necessity of using a blowtorch or blowtorch characteristics such as heat, flame, or a generating process.

The conventional methods of detecting leaks in refrigeration use various devices, such as sulphur candles and sticks and burning sulphur is held close to a joint or crack where a leak may occur and by this process, in which the hands of the operator are often burned, the burning sulphur drops over the equipment and floor and cleaning thereof is difficult. With this thought in mind this invention contemplates a method of detecting leaks and preventing a natural fire hazard caused by the use of conventional leak detectors, by holding a dispersion tube, for gentle expansion of sulphur or ammonia refrigerant, adjacent a joint or a crack and at the point of the leak a white cloud of ammonia sulphate will appear visibly indicating the location of the leak.

The object of this invention is, therefore, to provide an improved leak detector wherein sulphur or ammonia is metered from a reservoir through a vaporizing capillary tube or evaporator to a dispersion tube whereby gas passing from the dispersion tube creates a chemical visible reaction in the presence of escaping gas from a leak in a refrigeration system.

Another object of the invention is to provide means for detecting gas escaping from a refrigeration system without the use of a flame.

A further object of the invention is to provide a refrigerant gas conversion leak detector which is of a simple and economical construction.

With these and other objects and advantages in view the invention embodies a vaporizing capillary tube or evaporator having a dispersion tube extended from the extended end and positioned with the opposite end connected to a reservoir through metering, recharging and control valves.

Other features and advantages of the invention will appear from the following description taken in connection with the drawing, wherein:

Figure 1 is an elevational view of the improved leak detector with the tip of a dispersion tube thereof and also parts of a reservoir and control valve leading therefrom broken away and the remaining parts shown in section.

Figure 2 is a vertical section through the needle and recharging valve body of the detector.

Figure 3 is an elevational view with parts broken away and parts shown in section illustrating a stand in which the device may be supported in a vertical position.

Figure 4 is a side elevational view, similar to that shown in Fig. 1 showing a section through the dispersion tube and illustrating a modification wherein the vaporizing capillary tube is replaced with a tube having a wick therein.

Referring now to the drawing wherein like reference characters denote corresponding parts the improved leak detector of this invention includes a vaporizing capillary tube 10, a dispersion tube 11 extended from one end of the tube 10, a reservoir 12 connected to the lower end of the tube 10 through a liquid diffuser or nipple 13 with a control valve 14 between the reservoir and nipple and with a needle valve 15 and recharging valve 16 in a valve body 17 connecting the nipple to the lower end of the vaporizing capillary tube or evaporator 10.

The vaporizing capillary tube or evaporator 10 is formed with a tube coiled to provide a plurality of convolutions with the lower end 18 secured by a coupling nut 19 to a threaded nipple 20 extended from the valve body 17 with a packing gland 21 between the nut and end of the nipple, and with the upper end 22 secured in a reduced tip 23 of the dispersion tube 11.

The valve body 17 is provided with a valve seat 24 for the needle valve 15, the stem 25 of which is threaded in a nipple 26 extended from the valve body and the area around the stem 25 is sealed with a packing gland 27 in a nut 28.

The valve body 17 is also provided with a recharging valve 16 on the inner end of a stem 29 on the outer end of which is a handle 30 and, as shown in Fig. 2, the valve 16 is urged against a seat 31 by a spring 32 in a counterbore 33 extended through a threaded boss 34 on which a nut 35 is threaded. The valve body 17 is provided with a filling plug or nut 36 which is adapted to be removed to facilitate inserting sulphur or ammonia for recharging the detector.

The reservoir 12 is provided with a threaded, cup-shaped base 37 having an annular flange 38 threaded on a rim 39 at the lower end of the upper section 12 and the base 37 is provided with an arcuate lower end 40 that is adapted to be positioned in an arcuate recess 41 of a foot or stand 42 for retaining the device in an upright position. The lower end of the stand 42 is provided with a recess 43 and a drain opening 44 provides communicating means between the recesses 41 and 43.

The reservoir 12 is also provided with a nipple 45 having a bead 46 on the upper end in which a nipple 47 of the supply valve body 14 is threaded and, as illustrated in Fig. 1, the valve body 14 is provided with a valve seat 48 that is positioned to receive a valve element 49 on the lower end of a stem 50 that is threaded in the upper end of the valve body and the upper end is sealed with a packing gland 51 and a coupling nut 52. The upper end of the stem is also provided with a handle 53 by which the position of the valve element 49 is adjusted. The liquid diffusing nipple 13 is threaded in a boss 54 extended from one side of the valve body 14 and the interior of the nipple communicates with an opening 55 in the wall of the valve body. The opposite end of the nipple 13 is threaded in a boss 56 extended from one side of the valve body 17 and the nipple is secured in the boss with a lock nut 57.

In the design illustrated in Fig. 4 a valve body 58, similar to the valve body 17 is connected to a reservoir 59 with a nipple 60 providing a liquid diffuser between the reservoir and valve body and the nipple 60 is threaded in a fitting or valve body 61, similar to the valve 14 on the upper end of the reservoir, the valve body 61 being provided with a valve stem 62 and a handle 63, similar to the stem 50 and handle 53 and the valve body 58 being provided with a needle valve stem 64 and a recharging valve having a handle 65.

The valve body 58 is provided with a threaded nipple 66 to which a tube 67 is connected with a coupling nut 68 and the upper end of the tube 68 is connected to a reduced lower end 69 of a dispersion tube 70, similar to the dispersion tube 11. In this design the tube 67 is provided with a wick 71 to prevent liquification and condensation. The lower end of the tube 67 is provided with a rim or flange 72 by which the tube is secured to the nipple 66 of the valve body 18 with the coupling nut 68.

With the parts designed and assembled as illustrated and described gas is dispersed from the reservoir through the control valves and evaporator to the dispersion tube 11 from which the gas emanates gently and with the end of the tube held in the vicinity of a joint, fitting, or possible crack the gas emanating from the tube coacts with the gas from the leak creating a chemical visible reaction which determines the location of a leak without using blowtorch principles such as heat, flame, or generating processes.

When checking for ammonia leaks sulphur refrigerant may be used and when checking for sulphur leaks ammonia may be used in the reservoir.

Where the leaking gas is excessive the leak detector will release sufficient counter-acting vapor to neutralize the escaping gas making it possible to breathe in the vicinity of the leak. The leak detector may be used as an atomizer spray in providing enough sulphur or ammonia vapor for temporary means for neutralizing gas to facilitate repair of a leak in addition to providing means for locating the leak.

It will be understood that other modifications, within the scope of the appended claims, may be made in the design and arrangement of the parts without departing from the spirit of the invention.

What is claimed is:

1. In a leak detecting apparatus, the combination which comprises a tube positioned in a vertically disposed coil and in which the convolutions thereof are in spaced relation providing a vaporizer, a vertically disposed tube having a conical-shaped lower end extended upwardly from the upper end of the tubular coil in vertical alinement therewith and open at its upper end, the conical-shaped lower end of the vertically disposed tube being connected to the upper end of the tubular coil, a valve body connected to the lower end of the tubular coil, a needle valve positioned in an end of the valve body connected to the coil, a recharging valve also mounted in the valve body and spaced from the needle valve, a nipple providing a liquid diffuser extended from one side of said valve body, a supply valve threaded on the nipple, and a storage and supply reservoir threaded on said supply valve.

2. In a leak detecting apparatus, the combination which comprises a tube positioned in a vertically disposed coil and in which the convolutions thereof are in spaced relation to each other, a wick in said coil providing a vaporizer, a vertically disposed tube having a conical-shaped lower end extended upwardly from the tubular coil in vertical alinement therewith and open at its upper end providing a dispersion tube, the conical-shaped lower end of the dispersion tube being connected to the upper end of the tubular coil, a valve body connected to the lower end of the tubular coil, a needle valve positioned in the end of the valve body connected to the coil, a recharging valve also mounted in the valve body and spaced from the needle valve, a filler plug threaded in the valve body and spaced from the recharging valve, a nipple providing a liquid diffuser extended from one side of said valve body at right angles thereto, a supply valve threaded on the nipple, and a supply and storage reservoir threaded on said supply valve.

References Cited in the file of this patent

UNITED STATES PATENTS

| | | |
|---|---|---|
| 867,942 | Bobrick | Oct. 15, 1907 |
| 1,241,664 | Rustige | Oct. 2, 1917 |
| 1,662,263 | Harris | Mar. 13, 1928 |
| 1,750,512 | Ewald | Mar. 11, 1930 |
| 1,835,887 | Mackey | Dec. 8, 1931 |
| 1,885,644 | Thomas | Nov. 1, 1932 |
| 2,158,458 | Mathis | May 16, 1939 |
| 2,313,930 | Gebauer | Mar. 16, 1943 |
| 2,416,256 | Hockberg | Feb. 18, 1947 |
| 2,479,737 | Garretson | Aug. 23, 1949 |
| 2,515,569 | Pozun | July 18, 1950 |
| 2,525,874 | Larzelere | Oct. 17, 1950 |
| 2,527,359 | Guth | Oct. 24, 1950 |
| 2,547,018 | Kucher | Apr. 3, 1951 |
| 2,548,352 | Courtot | Apr. 10, 1951 |
| 2,780,071 | Calva | Feb. 5, 1957 |
| 2,807,144 | St. Clair | Sept. 24, 1957 |